United States Patent Office 2,986,511
Patented May 30, 1961

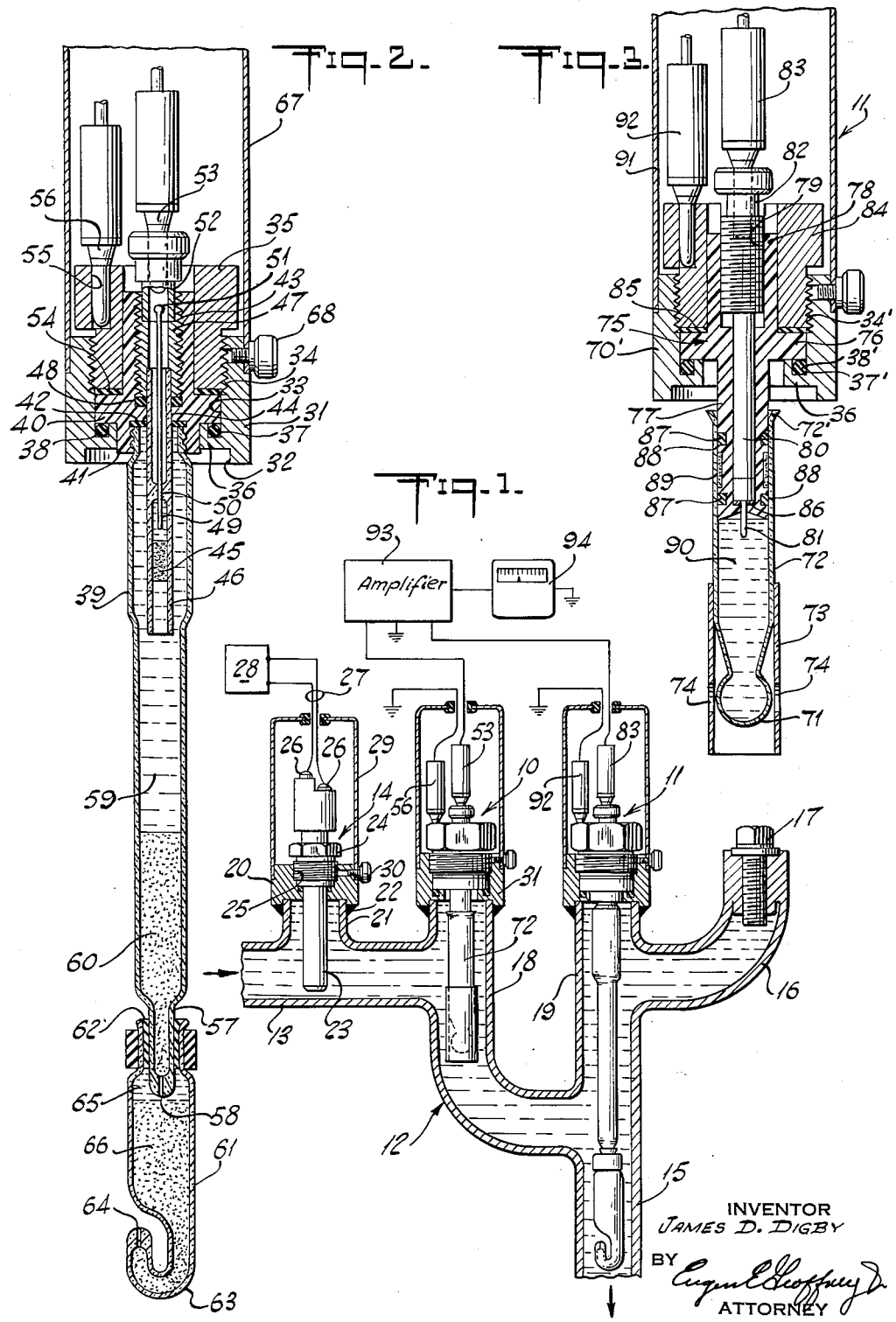

2,986,511

APPARATUS FOR MEASURING THE pH OF SOLUTIONS

James D. Digby, Croton-on-Hudson, N.Y., assignor to Cambridge Instrument Company, Inc., New York, N.Y., a corporation of New York Filed Aug. 27, 1957, Ser. No. 680,455

12 Claims. (Cl. 204—195)

This invention relates to measuring apparatus and more specifically to an improved method and apparatus particularly useful for determining the pH of solutions under relatively high pressures.

The measurement of the pH (acidity or alkalinity) of a solution may be made by several different procedures, one of which utilizes a so called glass electrode or membrane having the property of generating on its surface an electric potential proportional to the pH of the solution in which it is immersed. In actual practice the glass electrode is in the form of an exceedingly thin glass membrane closing the end of the tube. The tube includes a silver chloride electrode and is filled with a buffer solution. It is then immersed along with a reference electrode, such as a calomel electrode, in a test solution and then connecting suitable indicating means between the calomel electrode and the silver chloride electrode, the flow of current thus produced will be proportional to the pH of the test solution. While the foregoing apparatus is highly satisfactory, it is useful only for low pressure solutions since the glass membrane is of the order .001" to .003" in thickness in order to maintain the resistance at a low enough value to provide satisfactory measurements. In the past, pH measurements in high pressure solutions required thicker membranes resulting in a loss of sensitivity.

This invention overcomes the above and other disadvantages of prior pH measuring apparatus and provides means utilizing an exceedingly thin membrane of glass or other suitable material that affords a dependable rugged device for measuring the pH of solutions over a relatively wide range of pressures up to and even exceeding 100 or 200 pounds per square inch.

Another object of the invention is a novel and improved device for measuring the pH of solutions that will operate without attendance or maintenance for extended periods of time.

Still another object of the invention resides in the provision of novel and improved pH measuring apparatus that will withstand relatively high pressures and is characterized by its simplicity, ruggedness and ease of maintenance.

A further object of the invention is a novel and improved mounting for pH electrodes.

A still further object of the invention is a novel and improved device for measuring the pH of solutions.

The above and other objects of the invention will become more apparent from the following description and accompanying drawings forming part of this application.

In the drawings:

Fig. 1 is a cross sectional view of one embodiment of the invention with certain elements in elevation;

Fig. 2 is a cross sectional view of an improved reference calomel electrode; and Fig. 3 is a cross sectional view of a glass electrode in accordance with the invention.

As pointed out above the measurement of acidity and alkalinity of solutions by means of electrodes having exceedingly thin membranes has generally been restricted to use with liquids under very low pressures because of the fragility of the membrane.

The glass electrode method of measuring the pH of solutions involves the use of a thin glass membrane generally in the form of a sphere secured to and closing the end of an elongated tube. The tube and spherical membrane are filled with a reference solution in which an electrode containing silver chloride is inserted. The electrode is then immersed in the solution to be tested. A second cooperating or reference electrode is also inserted in the solution. This calomel electrode diffuses minute amounts of potassium chloride into the liquid being tested. With this arrangement a voltage is developed across the glass membrane and measured by connection of an indicator to the silver chloride and calomel electrodes. From the foregoing it is quite evident that the thickness and composition of the glass membrane affects the impedance of the current path and consequently the sensitivity and accuracy of the equipment. Accordingly the glass membrane must be maintained as thin as possible and its resistance should not exceed 400 megohms which with present materials dictates diaphragm thicknesses of the order of .001" to .003". With thin membranes of this character it is evident that they can be subjected only to very small pressure differentials and even then such pressure differentials can only be applied gradually in order to avoid fracturing the material.

In accordance with the invention the glass electrode is supported within the solution being tested in such a manner that changes in pressure of the solution are applied simultaneously to both surfaces of the glass membrane so that the differential pressure is always maintained substantially at zero. It has been found that with this improved mount the glass electrode can be used to measure the pH of solutions under relatively high pressures and forms a dependable and rugged structure.

In addition to the improved glass electrode and mount therefor the invention further contemplates its combination with an improved cooperating reference electrode for diffusing minute amounts of a conductive solution into the liquid being tested and that will function for extended periods of time without the need for recharging the electrode or performing other maintenance.

Referring now to the drawings and more specifically to Fig. 1 the glass membrane electrode and supporting means are generally denoted by the numeral 10, while the calomel electrode assembly is generally denoted by the numeral 11. These electrodes are immersed in the liquid to be tested, which in the instant embodiment of the invention, flows through a U-shaped housing generally denoted by the numeral 12. The fluid enters the housing 12 through a conduit 13 and a temperature measuring element 14 inserted in the conduit 13 in order to measure the temperature of the solution as the temperature affects the determination of pH. The fluid first enters the leg 18 of the U-shaped housing containing the glass electrode 10 and then flows outwardly through a second conduit 15 in line with the other leg 19 of the U-shaped housing 12 and past the lower end of the calomel electrode 11. A vent 16 is connected with leg 19 of the housing 12 and is closed by a removable plug 17 in order to bleed air from the system.

The temperature measuring element 14 may be of any suitable construction and includes a base member 20 sealed to an upwardly extending tube 21 communicating with the conduit 13. The base 20 is preferably welded to the tube 21 as indicated at 22 though it may be secured by other suitable fastening means. The temperature measuring element 23 is carried by and extends through an annular threaded connector 24 which engages a central opening 25 in the base 20. The upper end of the connector includes a pair of terminals 26 for the attachment of wires 27 connected to a suitable indicator 28 for indicating the temperature of the solution. A protective cover 29 is placed over the outer end of the temperature measuring element 23. It engages the base 20 and is held in place by a thumb screw 30.

The calomel electrode 11 is shown in detail in Fig. 2 and comprises an annular base member 31 sealed to the upper end of the leg 19 of the U-shaped well generally denoted by the numeral 12. The base has a recess 32 in the bottom thereof for cooperation with the tube 19 and has a central opening 33 of relatively large diameter, the upper portion 34 of the opening 33 having threads for engagement with the threaded periphery of the annular connector 35. An inwardly formed rib or flange 36 is disposed between the central opening 33 and the recess 32 and this flange includes an annular recess 37 for the reception of a sealing ring 38.

The calomel electrode includes an elongated glass tube 39 threadably engaging an opening in the bottom side of an annular body member 40 of insulating material. This annular member has a lower reduced section 41 engaging the opening defined by the flange 36 and the adjoining shoulder bears downwardly against the flange 36 and sealing ring 38 to seal the member 40 to the base 31. The glass tube 39 is sealed to the member 40 by a gasket 42 disposed in the base of the tube receiving opening. The upper end of the annular member 40 is also of reduced section and has a threaded opening 43 extending therein. The threaded opening communicates with the opening in the tube 39 by an intervening passage 44 and an electrode 45 of calomel and housed in an open ended glass tube 46 is carried by a threaded plug 47 and extends through the passage 31 and into the depending tube 39. The plug 47 is preferably of metal and when in position is sealed to the member 40 by a gasket 48. The calomel electrode 45 is connected by a lead 49 extending upwardly through a glass seal 50 in tube 46 and thence upwardly where it is connected to the metal plug 47, as indicated at 51. The upper end of the plug includes a tubular connector 52 for receipt of a conventional banana plug generally denoted by the numeral 53. The member 40 which supports the tube 39 is sealed in place in the base 31 by the annular collar or connector 35 and a cooperating gasket 54. The ground terminal is provided by forming an opening 55 in the annular collar or connector 35 for the reception of a banana plug 56.

The lower end of the tube 39 terminates in a narrowed section 57 having a minute orifice 58 in the lower end thereof. The tube 39 during operation of the equipment is filled with a saturated potassium chloride solution generally denoted by the numeral 59 and potassium chloride crystals generally denoted by the numeral 60.

The narrowed portion 57 of the tube 39 carries a second tubular member 61 which is secured to the tubular section 57 by a gasket 62 of rubber or other suitable sealing material. The tubular member 61 is generally cylindrical and terminates in a U-shaped narrow section 63, the latter having a minute opening 64 in the upwardly formed end. This tubular member 61, as in the case with the tubular member 39 is filled with saturated potassium chloride solution 65 and potassium chloride crystals 66. The upper end of the calomel electrode is closed by a protective cap 67 secured in position on the base 31 by a thumb screw 68.

The calomel electrode described above may be fabricated of relatively heavy glass members 39 and 61 so that the electrode may be made quite rugged in order to withstand relatively high pressures. The glass electrode 10 now to be described differs from the calomel electrode in that it includes a membrane of exceedingly thin section in order to provide an instrument having adequate sensitivity. It has been found that through the novel and improved mount for the glass electrode in accordance with the invention and as shown in Fig. 3, the differential pressures across the membrane can be maintained at substantially zero and at the same time the space within the tube supporting the glass membrane can be sealed from the solution or liquid in which it is immersed.

Referring now to Fig. 3, the electrode includes a base 70' that is identical to the base 31 of Fig. 2, and is sealed to the upper end of leg 18 of the well 12. The glass membrane is generally denoted by the numeral 71 and is carried at the lower end of an elongated glass tube 72. A mechanical shield 73 surrounds the spherical membrane 71 and is carried by the tube body 72. It has at least two openings 74 in the wall thereof to provide for free flow of liquid in and about the spherical member 71. The tube 72 is carried by an elongated tubular body member generally denoted by the numeral 75. This tubular member has an enlarged portion 76 centrally thereof which seats against the gasket 38' in the recess 37' and a downwardly depending tubular section 77 which extends well below the bottom surface of the base 70'. The upper portion of the tubular member 75 has a tubular section 78 threadably receiving a tubular plug 79. The plug 79 is preferably formed of a conductive material and carries an elongated tubular member 80 of insulating material such as glass or the like. A silver electrode 81 extends through the tubular member 80 and projects from the lower end thereof. The upper end of the silver electrode 81 is secured in any suitable manner to the metal plug 79 and the upper end of the plug 79 has a tubular extension 82 for the reception of an electrical connector 83. The tubular member 75 is sealed in place in the base 70 by an annular plug 84 which threadably engages the opening 34' and is sealed to the top side of the enlarged section 76 of the tubular member 75 by a gasket 85. The elongated tubular member 80 is closed at its bottom end and is sealed to the lower end of the tubular extension 77 by a gasket 86, the lower end of the extension 77 having an opening just large enough to receive the end of the silver electrode 81.

The tubular membrane support 72 is sealed to and carried by the tubular member 77 by means of a pair of O-rings so that the latter are compressed when the tube 72 is forced over them, as in Fig. 3. Between the recesses 88 in the tubular member 77 there is a relatively shallow annular recess 89 containing a sealing fluid such as silicone oil or the like. The glass tube 72 is only slightly larger in diameter than the tubular member 77 and the upper end is flared outwardly as indicated at 72'.

To assemble the electrode shown in Fig. 3, the annular connector 84 and the tubular body member 75 are removed from the base 70'. The plug 79 together with the tube 80 and the electrode 81 are then removed from the body member. The glass tube 72 carrying the membrane 71 is filled with a suitable buffer solution to a predetermined level. It is then moved into engagement with the first O-ring 87 and shifted upwardly to a point at least partially covering the recess 89. Silicone oil is then inserted into the recess 89 through the aid of the tapered end 72', whereupon the tube 72 is then moved upwardly into the position shown in Fig. 3. The level of the buffer solution 90 within the tube 72 is now approximately even with the bottom end of the tubular member 77. When this has been accomplished, the electrode assembly including the elements 79, 80 and 81 are inserted as shown and described in connection with Fig. 3. The fluid 90 is now sealed within the glass tube 72 and the unit can be secured in place in the base 70' as shown in Fig. 3 by inserting the tube 72 through the opening in the base 70 and then sealing it by insertion of the annular plug 84. The upper end of the electrode 11 is closed by a protective cap 91 and a ground terminal 92 is provided in the same manner as illustrated and described in Fig. 2.

The terminals 53, 56, 83 and 92 are connected to a suitable amplifier 93 or other responsive means which in turn is connected to a suitable indicator 94.

It will be observed in connection with Fig. 1 that when the glass tube 72 which supports the glass membrane 71 is immersed within the liquid being tested, the pressure of the liquid is applied to both the outside of the membrane 71 as well as to the inside. This action takes place since the glass tube 72 can shift relative to the support 77 to automatically equalize the pressure inside and outside of the glass electrode. With the particular seal provided, and since the pressures are always equalized, the solution being tested cannot enter the tube 72, nor can the buffer solution 90 within the tube 72 escape therefrom. It has been found in actual tests that even with an exceedingly fragile membrane 71, the electrode will withstand pressures at least as high as 200 lbs. per square inch for indefinite periods of time.

While only one embodiment of the invention has been illustrated and described, it is apparent that modifications, alterations and changes may be made without departing from the true scope and spirit thereof.

What is claimed is:

1. In apparatus for measuring the pH of a solution, a tubular member adapted to receive a liquid, a pH responsive glass membrane closing one end of said member and an elongated piston-like support extending within and slidably receiving and holding said tubular member in sealed engagement therewith, said tubular member upon immersion in said solution being automatically movable relative to said support and equalizing the pressures on the inner and outer surfaces of said glass membrane.

2. In apparatus for measuring the pH of a solution, a hollow liquid filled electrode having a relatively thin glass membrane and means for movably supporting and sealing said electrode to provide a closed chamber therein and means subjecting said electrode including the seal between said electrode and support to the pressure of the liquid under test, said pressure displacing the electrode relative to said support and producing a pressure in said chamber and on the inner surface of said membrane substantially equal to the pressure of the solution reacting against the outer surface of the membrane.

3. A glass electrode for measuring the pH of a solution under test comprising a hollow fluid containing receptacle at least part thereof including a relatively thin pH responsive glass wall, a piston-like support for holding and slidably sealing said receptacle, and an electrically conductive member extending through said support and into said receptacle, said receptacle upon immersion in said solution under test being automatically displaced relative to said piston-like support and equalizing the pressure on the inner surface of said glass wall with the pressure of the test solution on the outer surface of said glass wall.

4. A glass electrode according to claim 3 wherein said receptacle and support are tubular and said support includes at least one annular recess and a resilient sealing ring in said recess for sealing said receptacle to said support.

5. A glass electrode according to claim 4 wherein said support includes a pair of spaced annular recesses, sealing rings in said recesses and said support further includes a third annular recess between the first said recesses, and a sealing liquid in the last said recess.

6. A glass electrode according to claim 5 wherein said sealing liquid is a silicone.

7. Apparatus for measuring the pH of a solution comprising a liquid filled tubular member including a glass pH responsive membrane, means including a support for slidably retaining said member for movement relative to the support, a cooperating reference electrode including an elongated liquid filled tube having a minute orifice in the lower end thereof and a second liquid filled tube carried by and in communication with the orifice of the first said tube, and a U-shaped end portion on said second tube including an upwardly opening minute orifice therein.

8. Apparatus according to claim 7 wherein said support includes a pair of spaced annular recesses and an intervening annular recess, gaskets within said spaced recesses and a sealing liquid in said intervening recess.

9. An electrode for measuring the pH of a solution under pressure comprising a tubular member, a pH responsive membrane of insulating material closing one end of said tubular member, an elongated support for said tubular member and resilient means between said tubular member and support for retaining said tubular member in sealed slidable engagement with said support, the variations in pressure within said tubular member upon displacement of said member relative to the support automatically reacting on the inner surface of said membrane.

10. A pH measuring electrode comprising a fixed electrode support, an elongated tubular member extending from said support and having a conductive member extending therethrough and in sealed relationship to said support, an elongated liquid-filled member having a thin glass membrane enclosing one end thereof and having its other end in surrounding relationship to said support, and means between said support and the other end of said liquid-filled member for holding the liquid-filled member in reciprocable slidable and sealed relationship to said support, said liquid-filled member upon immersion in a solution being moved relative to said support in response to changes in pressure of said solution exerted on said membrane and producing a pressure on the inner surface of said membrane to maintain the differential pressure on said membrane substantially at zero.

11. In apparatus for measuring the pH of a solution contained within a vessel under pressure said vessel having a wall including an opening therein, a pH measuring electrode comprising a closure member secured in and closing said opening, an elongated supporting member carried by the closure member and extending into said vessel, an electrode extending through said closure and support in sealed relationship thereto, an elongated liquid-filled member having one end slidably engaging said supporting member and a thin membrane closing the other end and means between said elongated liquid-filled member and said supporting member for holding the elongated liquid-filled member in slidably sealed relationship with said supporting member, said elongated member moving relative to said supporting member and modifying the pressure within said vessel and on the inner surface of said membrane to neutralize the pressure on the outer surface of said glass membrane.

12. In apparatus according to claim 11 wherein said supporting member includes a pair of annular grooves and the last said means comprises a pair of O-rings carried in said grooves for slidably retaining the liquid-filled member in sealed relationship with said supporting member.

References Cited in the file of this patent

UNITED STATES PATENTS

| | | |
|---|---|---|
| 2,108,293 | Perley | Feb. 15, 1938 |
| 2,117,596 | Bender et al. | May 17, 1938 |
| 2,697,070 | Arthur | Dec. 14, 1954 |
| 2,705,220 | Arthur | Mar. 29, 1955 |
| 2,755,243 | Beckman et al. | July 17, 1956 |
| 2,756,203 | Gilbert | July 24, 1956 |
| 2,859,164 | Michelson et al. | Nov. 4, 1958 |

FOREIGN PATENTS

| | | |
|---|---|---|
| 882,316 | Germany | July 9, 1953 |
| 8,108/1892 | Great Britain | Mar. 11, 1893 |

OTHER REFERENCES

J. Soc. Chem. Ind., July 1945, pp. 196–200, article by Ingram et al.